United States Patent [19]

Hughes

[11] Patent Number: 4,611,829
[45] Date of Patent: Sep. 16, 1986

[54] MISALIGNMENT TIEBACK TOOL - SWIVEL CONNECTION

[75] Inventor: David W. Hughes, Houston, Tex.

[73] Assignee: Vetco Offshore Industries, Inc., Ventura, Calif.

[21] Appl. No.: 659,604

[22] Filed: Oct. 12, 1984

[51] Int. Cl.[4] ............................................. F16L 35/00
[52] U.S. Cl. ...................................... 285/18; 285/39; 285/24; 285/27; 285/321; 285/308; 166/344; 166/345
[58] Field of Search ...................... 285/18, 39, 24, 27, 285/321, 308; 166/344, 345

[56] References Cited

U.S. PATENT DOCUMENTS

| | | | |
|---|---|---|---|
| 3,345,087 | 10/1967 | Hanes et al. | 285/39 |
| 4,138,148 | 2/1979 | Zaremba | 285/39 |
| 4,139,222 | 2/1979 | Loland | 285/27 |
| 4,277,875 | 7/1981 | Worrell | 285/39 |
| 4,289,206 | 9/1981 | Kirkland | 285/39 |
| 4,343,495 | 8/1982 | Nobileau et al. | 285/23 |

Primary Examiner—Cornelius J. Husar
Assistant Examiner—Douglas W. Hanson
Attorney, Agent, or Firm—Joseph R. Dwyer

[57] ABSTRACT

A tieback tool (10) for connecting tieback conductors (12) to a well system (14) where there is misalignment between the tool and the well system including a body (40) rigidly connected to the tieback conductor (12), a stab connector (12) swivel mounted on said body and free to align with the well system during initial contact between the tieback tool and the well system, and an internal straightening stab (60) which is extended by rotation into the well system to finally align the tieback tool with the well system. In one embodiment, the tieback conductor (12) is not rotated to make up the final connection of the tool and the well system, the straightening stab (60) is extended into the well system by a rotatable torquing tool (66), and the stab connector (16) locks on to the well system by a lock ring (32). In the second embodiment, the tieback conductor (18) is rotated to make up the connection of the tool (10A) with the well system (14A), it is the body (40) itself which acts as the strightening stab (60A) by rotation of the tieback conductor (18), and the stab connector (16A) locks into the well system by threads (90, 112). In both embodiments, the stab connector (16, 16A) is swivel mounted in the tool.

12 Claims, 6 Drawing Figures

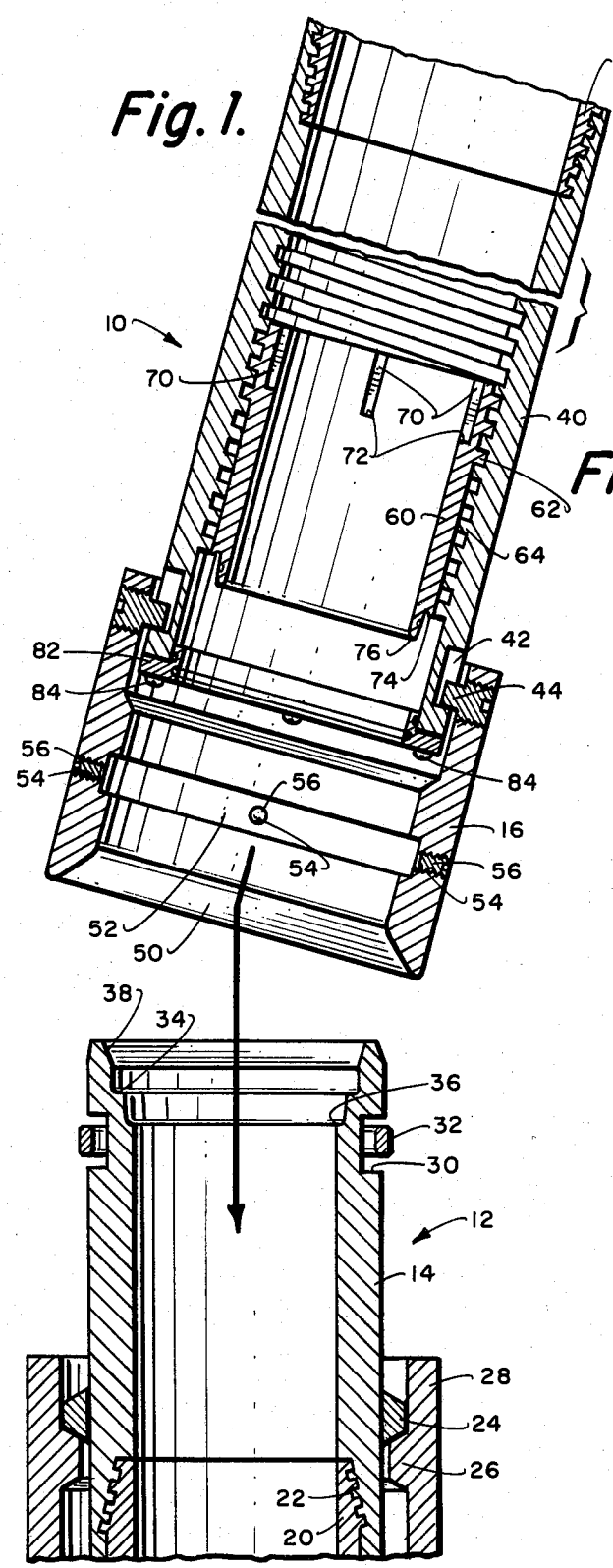
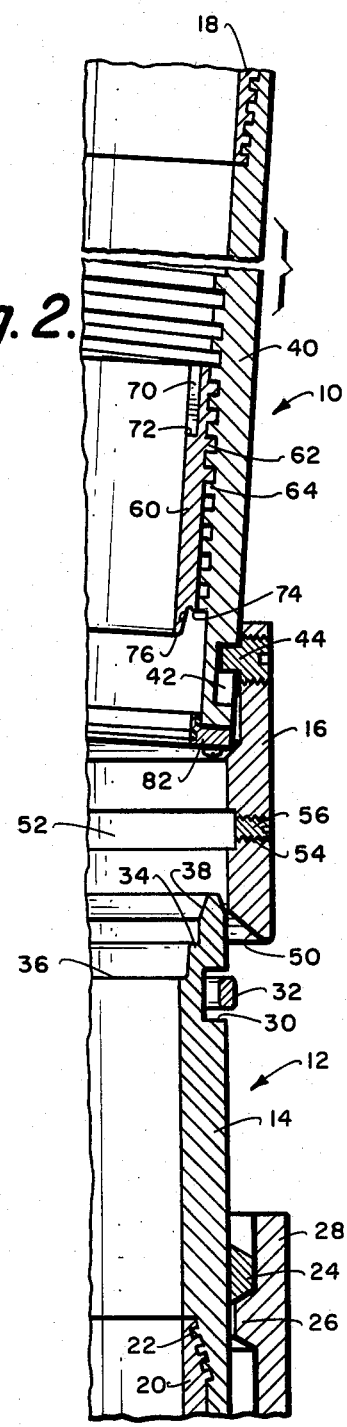

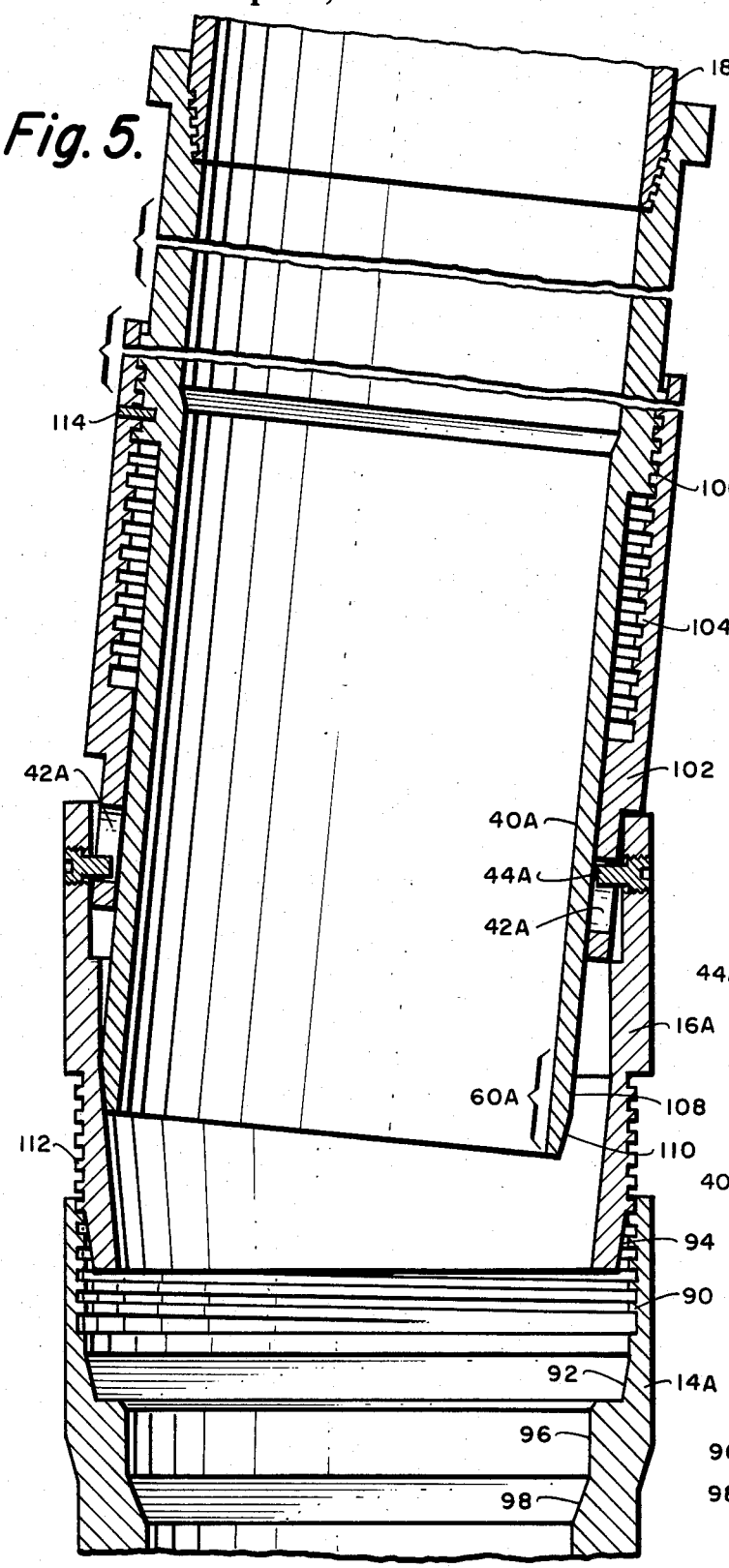
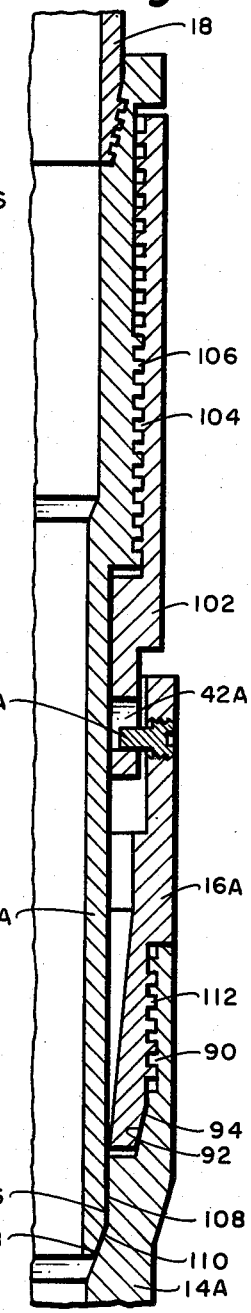
Fig. 5.
Fig. 6.

MISALIGNMENT TIEBACK TOOL - SWIVEL CONNECTION

BACKGROUND OF INVENTION

This invention relates to offshore oil production apparatus and, in particular, to tieback tools for connection of a tieback conductor to a subsea well.

Offshore oil wells may be drilled from a drilling vessel or rig and thereafter produced to a fixed platform. Typically, once a well is drilled to depth, it is plugged, a protective cap installed and the drilling vessel moved to another well location. The fixed platform is then moved to a position over the well, the cap removed and tieback conductors are run from the platform deck to the well. Tubing is then run, surface production trees installed, and the well produced in the conventional manner.

A complication comes about, however, because it is nearly impossible to align the fixed platform precisely over the well system and, although the tieback conductor string runs through the guides at various elevation, offset still occurs due to well system settling and other physical factors. The problem of misalignment is particularly acute in the vicinity of the well system where the tieback conductor is to be joined to the well.

Funnels have been used in tieback tools or connectors as one way to overcome the alignment problem and to prevent damage to engaging threads as shown, for example, in U.S. Pat. Nos. 4,343,495 and 4,408,782. These funnels align the tool with the well system before threading the tool onto the well system. Another way to solve the problem of misalignment is to use either a tieback tool, such as shown in the co-pending application of Hughes and Milberger, application Ser. No. 659,603 entitled Misalignment Tieback Tool—Rotating Casing, filed 10/12/84, or such as shown in the co-pending application of Hughes, Ser. No. 659,605, filed 10/12/84 entitled Misalignment Tieback Tool—Non-Rotating Casing. The Hughes and Milberger tieback tool has a threaded ring with dogs for aligning with J-slots in a casing hanger for initial alignment. After this initial alignment, continued rotation of this tieback conductor actuates the threaded ring to lock the tieback tool onto the casing hanger via the dogs and J-slots. (In the Hughes invention, the dogs, although on the body of the tool, cooperate similarly with J-slots in a casing hanger, but a torquing tool is used to rotate a threaded ring to lock the tieback tool to the casing hanger.) The tieback tool of the Hughes and Milberger application is characterized by a rotation of the tieback conductor to lock the tieback tool into the well system, whereas the tieback tool of the Hughes application does not require rotation of the tieback conductor, but uses a torquing tool to lock the tieback tool into the well system.

SUMMARY OF THE INVENTION

In the first embodiment of the tieback tool of this invention for connecting tieback conductors to the well system, in this case a mudline casing hanger, an upper body, adapted to be rigidly connected to one of the tieback conductors, contains a stab connector to be guided over the casing hanger. Pins on the stab connector, engaging vertical slots in the body member, form a swivel or universal joint connection between the connector and the body member to allow the tieback tool to align with the casing hanger on initial engagement. A split lock ring, between the stab connector and casing hanger, locks the stab connector onto the casing and an internal straightening stab, threadably received in the body member, is extended into the casing hanger by a rotatable running tool to engage and seal the tieback tool onto the casing hanger and provide the final alignment between the body member, tieback conductor and casing hanger.

In the second embodiment of the tieback tool, the stab connector is similarly connected into the tieback tool by pins on the stab connector engaging vertical slots to allow the tool to initially align with the casing hanger but instead of a split lock ring, the stab connector is provided with external threads which engage internal threads in the casing hanger to lock the stab connector onto the casing hanger, and the body member itself becomes the internal straightening stab which is extended into the casing hanger to engage and seal the tieback tool onto the casing hanger and provide the final alignment of the body member, tieback conductor and casing hanger.

In the first embodiment of the invention, the tieback conductors are not rotated to make up the connection, but in the second embodiment, the tieback conductors are rotated to make up the connection.

BRIEF DESCRIPTION OF THE DRAWINGS

FIG. 1 illustrates the first embodiment of the tieback tool in angular misalignment with the casing hanger as the tieback tool approaches the well, FIG. 2 is a cross-sectional view of showing the initial engagement of the tieback tool of FIG. 1 and the tip of the casing hanger of the well and illustrating the swivel connection of the stab connector, FIG. 5 illustrates the second embodiment of the tieback tool in initial engagement with the casing hanger, and FIG. 6 is a partial cross-sectional view illustrating the tieback tool fully connected to the casing hanger and in final alignment therewith.

DETAILED DESCRIPTION

Figure 3:
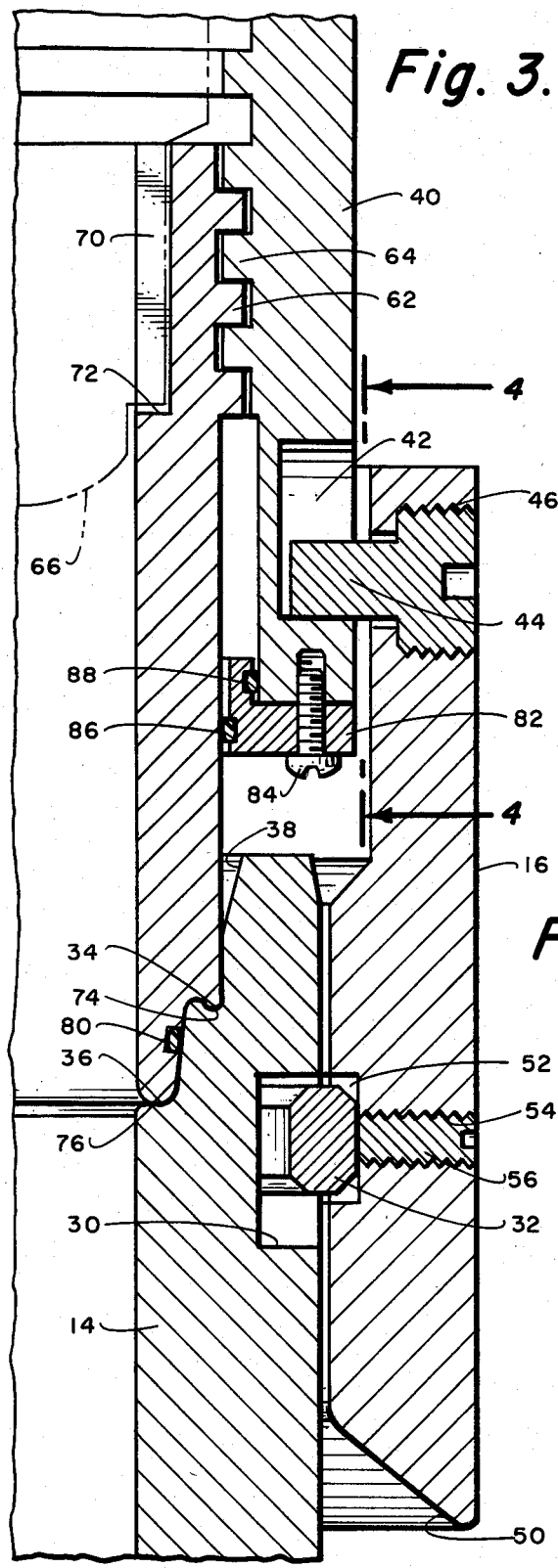
FIG. 3 illustrates the tieback tool of FIG. 1 fully connected to the casing hanger with the stab connector locked onto the casing hanger on the outer periphery and the internal straightening stab engaged for final alignment of the tool and casing hanger.
Figure 4:
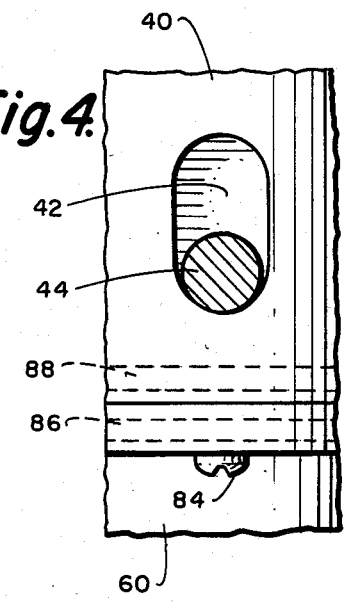
FIG. 4 is a partial elevational view taken along line 4—4 of FIG. 3 illustrating the swivel connection of the stab connector in the tool.

In the drawings, FIG. 1 illustrates the tieback tool 10 as it approaches the well system 12, in particular, a casing hanger 14, and FIG. 2 illustrates the function of a swivel mounted stab connector 16 on the tieback tool. More details of the tieback tool and well system are shown in FIGS. 3 and 4.

FIGS. 1 through 4 illustrate the first embodiment of the invention and it can be seen that the tieback tool 10 is rigidly connected and sealed to the lower end of one external tieback conductor or casing 18 which is to be connected and sealed onto the casing hanger 14. Tieback conductor 18 is the lower one of a string of conductors which are anchored to the platform and put in tension. Casing hanger 14 was previously installed with casing 20 connected as tapered threads 22 on the lower end of the casing hanger.

Also, prior to the approach of the tieback tool as shown in FIG. 1, a protective cap was removed from the casing hanger.

The previously installed casing hanger 14 is shown with its external landing ring 24 engaging a landing profile 26 on an outer casing hanger 28. Only the landing area of the outer casing hanger 28 is shown in FIGS. 1 and 2. Typically, casing hanger 28 is a 30 inch hanger connected to 30 inch casing cemented in a previously drilled hole. Casing hanger 14 supports 20 inch casing which is also cemented in a previously drilled hole. The casing hanger 14, in turn has a profile on which may land still another internal casing, typically 13⅜ inch, which can be connected to other casing in the well. More casing hangers may be installed within the casing hanger 14.

The hanger 14 is provided with a circumferential groove 30 on its outer periphery and near its upper end which contains a metallic split locking ring 32. In the same area, the casing hanger is provided with a pair of internal spaced apart first and second surfaces 34 and 36 facing upwardly but with a small inclination inwardly and toward the open end of the casing hanger. Surfaces 34 and 36 are also offset relative to one another and relative to the center line of the casing hanger and purpose of the surfaces will become apparent from the description hereinafter. Finally, the casing hanger is bevelled as at 38.

The tieback tool itself, more clearly shown in detail in FIGS. 3 and 4, comprises a hollow cylindrical tubular upper body member 40. The upper body member is connected and sealed to the tieback conductor 18 as described above and has the aforementioned stab connector 16 mounted thereon. The stab connector 16 (sometimes called a "connector box" or "wobble nose"), whose inner diameter is slightly larger than the outer diameter of the casing hanger 14, is swivel mounted on the tubular body member. The mounting of the stab connector 16 is accomplished by providing the upper body member 40 with elongated vertically oriented slots 42 on the outer periphery near the lower end of the upper body member. These slots are long enough to allow radially inwardly extending pins 44, connected to the upper part of the stab connector, to be received in the slots and move vertically to enable the stab connector to tilt or swivel. This movement is also called a universal joint connection with a plurality of such slots, typically four, spaced 90° apart around the body member with a plurality of pins received therein. The number of pins correspond to the number of slots selected. The slots are blind, that is, do not extend through the body member wall, to prevent leakage therethrough and the pins are threaded into suitable external threads 46 in the stab connector to enable removal, if desired.

At about the midway point of the stab connector, its wall is thickened so that its inner diameter is only slightly larger than the outer diameter of the casing hanger. The thickened wall terminates at the mouth of the stab connector in an outwardly tapered or conical landing surface 50 to facilitate engagement of the stab connector and casing hanger (see FIG. 2). Between the beginning of the thickened portion and the tapered mouth, there is provided a peripheral groove 52 which cooperates with the split lock ring 32 to lock the stab onto the casing hanger and provide the initial alignment of the tool with the casing hanger. As shown, the split lock ring 32 is contained in the groove 30 of the casing hanger and will expand into the groove 52 in the stab connector when the two grooves are co-extensive as shown in FIG. 3. For later release and retrieval of the tieback tool, the stab connector is provided with a plurality of threaded bores 54 (one shown in FIG. 3 and three shown in FIG. 1) spaced about the stab connector to receive manually operated threaded pins 56 which engage the split ring and cause its retraction so that the stab connector can be disengaged. The split ring may also be installed in the groove 52 of the stab connector and allowed to expand into the groove 30 in the casing hanger as an alternative way of locking the stab connector onto the casing hanger.

For the final alignment of the upper body member 40 and casing hanger 14, an internal tubular straightening stab 60, telescoped within the upper body member, is provided with external threads 62 at its upper end to engage mating internal threads 64 on the upper body member. This internal straightening stab 60 is totally within the upper body member i.e., retracted, as the tieback tool is approaching the casing hanger 14 as shown in FIGS. 1 and 2 but when the stab connector 16 is locked over the casing hanger, a rotatable torquing tool 66, illustrated only in phantom, having vertical splines 70 engage vertically extending grooves 72 in the upper end of the internal straightening stab. This tool rotates to the right (counter-clockwise) to move the straightening stab out of the upper body member, that, downwardly as shown in the drawings, so that the end of the straightening stab enters the hanger internally and lands as clearly shown in FIG. 3. Bevelled edge 38 on the casing hanger may aid in the entry of the internal straightening stab into the casing hanger. The straightening stab is provided with a downwardly facing sealing surface 74 which, when finally landed, engages the inner surface 34 of the casing hanger while at the same time the end 76 of the straightening stab which mates the previously mentioned surface 36 near the upper end of the casing hanger. Between the end 76 of the straightening stab and the surface 74, an O-ring seal 80 in a suitable groove provides the seal between the tieback tool and the casing hanger. As is apparent, the inner diameter of the straightening stab and the casing hanger are substantially the same.

Finally, to complete the seal around the tool, a seal carrier 82 is attached to the lower end of the upper body member by any suitable means such as set screws 84. This seal carrier has two grooves to contain two O-ring seals 86 and 88, one seal engages the outer periphery of the internal straightening stab and the other seal engages the inner periphery of the upper body member, thus providing the fluid tight seal and preventing leakage through the threads 62 and 64.

From the foregoing and again with reference to FIGS. 1 and 2, it can be seen that, as the tieback tool 10 approaches the casing hanger 14, the stab connector 16 is essentially on the center line with the upper body member 40, but when the stab connector 16 initially engages the casing hanger, the center line of the stab connector swivels with respect to an angle with the center line of the upper body member. At the same time, the stab connector also serves to aid in the initial alignment of the tool with the casing hanger. Further downward movement of the tieback tool causes the centerline of the entire tool to become initially aligned with the center line of the casing hanger and the stab connector to lock over the casing hanger by the action of the split lock ring. At this time, the torquing tool 66 will be lowered through the tieback connector 18 and will engage the vertical grooves 72 in the upper end of the internal straightening stab, and rotate the internal straightening stab 60 until the stab has landed on the seals against the surfaces of the casing hanger.

FIGS. 5 and 6 illustrate the second embodiment of the invention. In the description of this embodiment, however, since the means for landing a casing hanger is disclosed in FIG. 1, only the upper end is illustrated in FIG. 5. The casing hanger, identified as 14A, differs only in that the upper end is provided with internal threads 90 rather than the split locking ring as in the case of FIGS. 1–4. However, the casing hanger 14A is also provided with a tapered landing surface 92 for the tapered end 94 of the stab connector 16A, and is further provided with a wall 96 and landing surface 98 for the lower end 60A of the upper body member 40A which, in this embodiment, forms the internal straightening stab.

In this embodiment, those components which perform substantially the same functions as those of FIGS. 1–5 will be given like reference numbers but with a suffix A. It is noted, however, that the stab connector 16 functions as a box while stab connector 16A functions as a pin in the conventional sense of connecting pipe joints.

The stab connector 16A itself is mounted on the tool in a manner similar to the stab connector of the first embodiment with radially inwardly extending pins 44A engaging in vertically extending slots 42A. However, in this case, the slots are located in a separate tubular member 102 which is provided with internal threads 104 which threadably engage mating threads 106 on the upper body member 40A. The body member 40A, like body member 40, is rigidly connected and sealed to the lower end of one external tieback conductor or casing 18. The lower end of the upper body member 60A is provided with surfaces 108 and 110 (one of which is tapered) which provide metal-to-metal sealing areas when the connector is fully made up by engaging surfaces 96 and 98 on the casing hanger 14A.

Thus, the purpose of the separate tubular body member 102 external to the upper body member 40A is to allow downward movement of the upper body member 40A since there is no separate internal straightening stab as in the other embodiments and the lower end 60A of the upper body member functions as the straightening stab.

FIG. 5 illustrates the tieback tool inner tapered leading edge 94 initially engaging of the casing hanger and with the stab connector 16A tilted or swiveled because of the misalignment. Thereafter, a continued downward movement of the tieback tool will cause external threads 112 on the stab connector to engage and rotational movement to the right (clockwise) of the casing 18 will thread i.e., telescope, the stab connector within the casing hanger as to provide the initial alignment. Thus, threads 90,112 serve the same function as the locking ring on the first embodiment. Thereafter, continued rotation of the tieback conductor 18 will cause shear pin 114 located between the outer tubular member 102 and the upper member 40A to shear, allowing the upper body member 40A to rotate and lower into the casing hanger where the sealing surfaces 108, 110 engage the sealing surfaces 96, 98 of the casing hanger as shown in FIG. 6. At this time, the tieback tool and the casing hanger are in axial alignment. The purpose of the shear pin 114 is to insure the threading of the stab connector 16A onto the casing hanger 14A before straightening stab portion 40A is lowered by threading into the casing hanger. Retrieval of the tieback tool is accomplished by a counterclockwise rotation of the tieback conductor 18.

In summary, this invention involves a tool capable of connecting tieback or other conductors onto a well system, whether a casing, wellhead or other devices, where misalignment as much as 5° occurs between the tool and well system. The embodiment selected to be used depends on whether or not rotation of the tieback or other conductor itself is to be rotated.

I claim:

1. A tieback tool for connecting a tieback conductor to a subsea well system comprising:
   a hollow tubular body member connected to the tieback conductor,
   aligning means on said tubular body member for aligning and locking said tool onto said well system, said aligning means including,
   a stab connector telescoped on one end of said tubular body member,
   means for mounting said stab connector in pivotal relationship with said tubular body member so that said stab connector is free to align with said subsea well system on initial engagement therewith,
   said pivot being activated upon initial engagement of said subsea well system,
   means for locking said stab connector and said tool in initial alignment with said well system, and
   stab means for engaging said well system in final alignment of said tubular body member with said well system.

2. The tool as claimed in claim 1 further including sealing means on said stab means for forming a fluid tight joint between said tieback tool and said well system.

3. The tool as claimed in claim 2 wherein said subsea well system includes a casing hanger and wherein said stab connector telescopes over said casing hanger after initial engagement by said stab connector.

4. The tool as claimed in claim 3 wherein said locking means comprises a split lock ring cooperating with grooves in said casing hanger and said stab connector.

5. The tool as claimed in claim 4 wherein said sealing means comprises an O-ring seal.

6. The tool as claimed in claim 5 wherein said stab means is a tubular member threadable within said tubular body member and actuatable by a rotatable torquing tool.

7. The tool as claimed in claim 2 wherein said subsea well system includes a casing hanger and wherein said stab connector telescopes within said casing hanger after initial engagement by said stab connector.

8. The tool as claimed in claim 7 wherein said locking means comprises mating threads on said stab connector and casing hanger.

9. The tool as claimed in claim 8 wherein said sealing means comprises metal-to-metal seals.

10. The tool as claimed in claim 9 wherein said stab means forms a part of said tubular body member rotatable by rotation of said tieback conductor.

11. A tieback tool for connecting a tieback conductor to a tubular member of a subsea well system comprising:
    a hollow tubular body member connected to the tieback conductor,
    aligning means on said tubular body for aligning and locking said tool onto said tubular member, said aligning means including, a stab connector telescoped on one end of said tubular body and mounted thereon so as to be able to pivot relative to said tubular body so that said stab connector is free to align with said tubular member on initial engagement therewith to thus perform the function of initially aligning the tubular body with the tubular member, means for locking said stab connector and said tool in said initial alignment with said tubular member, and stab means for engaging said tubular member in final alignment of said tubular body and said tubular member.

12. A tieback tool for connecting a tieback conductor to a tubular member of a subsea well system, said subsea well system having a hollow tubular member located subsea, a hollow tubular body connected to a tieback connector and adapted to be lowered into coupling relationship with said tubular member, aligning means on said tubular body for aligning and locking said tool onto said tubular member, said aligning means including, a stab connector telescoped on one end of said tubular body, means for mounting said stab connector on said tubular body and arranged in such a manner that said stab connector can assume a position of coaxial non-alignment with said tubular body when said stab connector engages said tubular member as said tubular body is lowered towards coupling relationship with said tubular member and when said tubular body is not initially coaxially aligned with said tubular member, the arrangement of said stab connector and said tubular body also being such that continued lowering of said tubular body initially aligns said stab connector coaxially with said tubular member and, in turn, initially aligns said tubular body coaxially with said tubular member, and stab means for engaging said tubular member in final alignment of said tool and said tubular member.

* * * * *